United States Patent [19]

Lichowsky

[11] 4,007,674
[45] Feb. 15, 1977

[54] BEVERAGE HEAT MAINTAINING APPARATUS

[75] Inventor: Abraham Lichowsky, Los Angeles, Calif.

[73] Assignees: Ambitex Corporation; Cendev Corporation, both of Los Angeles, Calif.

[22] Filed: Nov. 24, 1975

[21] Appl. No.: 634,663

[52] U.S. Cl. .............................. 99/281; 99/289 R
[51] Int. Cl.² ......................................... A47J 31/00
[58] Field of Search ............ 99/279, 275, 280–281, 99/289, 416; 219/431, 440, 441; 426/432; 23/267 R, 267 F

[56] References Cited

UNITED STATES PATENTS

| | | | |
|---|---|---|---|
| 1,428,349 | 9/1922 | Whelan | 99/279 UX |
| 1,794,641 | 3/1931 | Payson et al. | 99/279 UX |
| 1,905,986 | 4/1933 | Jacobs et al. | 99/275 |
| 1,987,892 | 1/1935 | Duevel, Jr. et al. | 99/279 UX |
| 2,166,728 | 7/1939 | Page | 99/281 UX |
| 2,179,936 | 11/1939 | Keene | 99/281 |
| 2,926,234 | 2/1960 | Palmer | 219/441 X |
| 3,143,955 | 8/1964 | Rockwell | 99/289 |
| 3,247,360 | 4/1966 | Ponder | 219/441 X |

Primary Examiner—Harvey C. Hornsby
Assistant Examiner—Arthur O. Henderson
Attorney, Agent, or Firm—Ralph B. Pastoriza

[57] ABSTRACT

A container of evacuated double wall construction has an open neck for receiving a beverage after the beverage has been heated to a desired temperature. A stopper member receivable in the open neck incorporates an evacuated electric light bulb covering a major portion of the cross sectional area of the neck to provide further heat insulation and also radiate heat onto beverage within the container. Regulation of the heat to maintain the beverage at a desired constant temperature is accomplished by a pressure actuated switch incorporated in the stopper member. When water is used as the beverage, the heated water can be passed from the container through an outlet spout to a cartridge housing including pay out and take up spools for a series of packets connected together to form a ribbon. Successive packets may be positioned under the spout and include coffee beans, the cartridge including a cup receiving area so that coffee can be brewed directly into a cup.

6 Claims, 2 Drawing Figures

BEVERAGE HEAT MAINTAINING APPARATUS

This invention relates to containers for maintaining beverages at a desired elevated temperature and also the provision of such a container in combination with a cartridge arrangement to provide an automatic coffee brewing arrangement.

BACKGROUND OF THE INVENTION

It is well known in the art that the best possible cup of coffee is provided when initially poured immediately or shortly after the coffee has been brewed. Thereafter, successive cups of coffee from the container of coffee, which container is normally maintained under a low heat, deteriorate in taste. This deterioration is a result of chemical reactions at elevated temperatures and evaporation of the water thereby increasing the concentration of undesirable components.

The foregoing problems have been largely overcome by the introduction of instant coffee; for example, "freeze-dried" coffee which may be dispensed in the form of granules from a jar into a coffee cup and the coffee cup simply filled with hot water which dissolves the granules. While fairly drinkable coffee results from this procedure and it certainly overcomes the problem of mixed coffee remaining standing in a pot, the resulting quality is far from that expected by those persons capable of distinguishing fine coffee from the ordinary substitutes.

Substantial improvement in maintaining the quality of coffee after it has been brewed in a pot or container could be realized if some means were provided to prevent undue evaporation and overheating while still maintaining the coffee in the container heated. Normally, actual boiling of coffee after it has been brewed is disastrous. Ideally, the coffee should be kept at a temperature slightly below the boiling point. Any provision for a hermetically sealed container must take into account possible overheating of the coffee which could result in a complete rupturing of the container itself.

Even with the above proposed solution, there still results deterioration of the coffee itself and for providing the ideal cup of coffee, the best solution would be to individually brew coffee for a cup each and every time a cup of coffee is desired. Such would be the optimum system for providing the most satisfactory coffee.

BRIEF DESCRIPTION OF THE PRESENT INVENTION

With the foregoing considerations in mind, the present invention contemplates the provision of an apparatus including a container for beverage which in certain instances might be water where the same is to be used to brew an individual cup of coffee itself, so constructed as to maintain the beverage at a desired temperature without the deleterious effects occurring as a consequence of evaporation. The invention also contemplates in combination with such a container a unique cartridge arrangement for enabling a cup of coffee to be prepared by actually brewing the coffee individually for that particular cup all to the end that the ideal cup of coffee is at last at hand.

More particularly, the invention contemplates the provision of a container having evacuated double wall construction to provide heat insulation and an open neck for receiving a beverage after the beverage has been initially heated to a desired temperature. A stopper member is receivable in the neck and incorporates an electric bulb having an exposed surface facing downwardly towards the top surface of the beverage when the container is filled. Electrical conductors pass from the bulb through the stopper member and to the exterior thereof for connection to a source of electrical energy to energize the bulb. The bulb itself is evacuated so that a major cross sectional area of the neck portion of the container is vacuum insulated by the bulb. As a consequence, excellent heat retaining properties result in the container and stopper structure.

In accord with further features of the invention, the stopper means includes a pressure actuated switch connected in one of the electrical conductors in the stopper responsive to the vapor pressure in the container exceeding a given value resulting when the temperature of the beverage exceeds a desired temperature to open the circuit to the light bulb and thus remove the radiated heat. The same pressure responsive switch will close when the vapor pressure falls below a given value resulting when the temperature of the beverage itself falls below the desired temperature. Regulation of the beverage temperature is thus realized and yet the entire container is hermetically sealed.

The same above referred to stopper member includes valve means intercepting an internal passage terminating exterior of the container in a spout and interior of the container in an elongated flexible tube which extends to the bottom of the container below the liquid level. Vapor pressure developed will thus force the liquid up through the tube when the internal passage is opened by the valve means to dispense beverage from the spout.

In the brewing of individual cups of coffee, there is provided a cartridge means cooperating with the container capable of positioning individual packets of coffee beans beneath the spout so that the heated beverage which in this case would be water, saturates the packet and results in brewed coffee dropping into a cup received in the lower portion of the cartridge.

BRIEF DESCRIPTION OF THE DRAWINGS

A better understanding of this invention will be had by now referring to the accompanying drawings in which.

DETAILED DESCRIPTION OF THE INVENTION

For purposes of illustrating basic features of the invention, it will be described in conjunction with making coffee wherein the beverage used is water. It is to be understood, however, that component parts may be utilized for making other beverages such as tea as well as providing a means for simply keeping beverages at a desired temperature over long periods of time.

Figure 1:
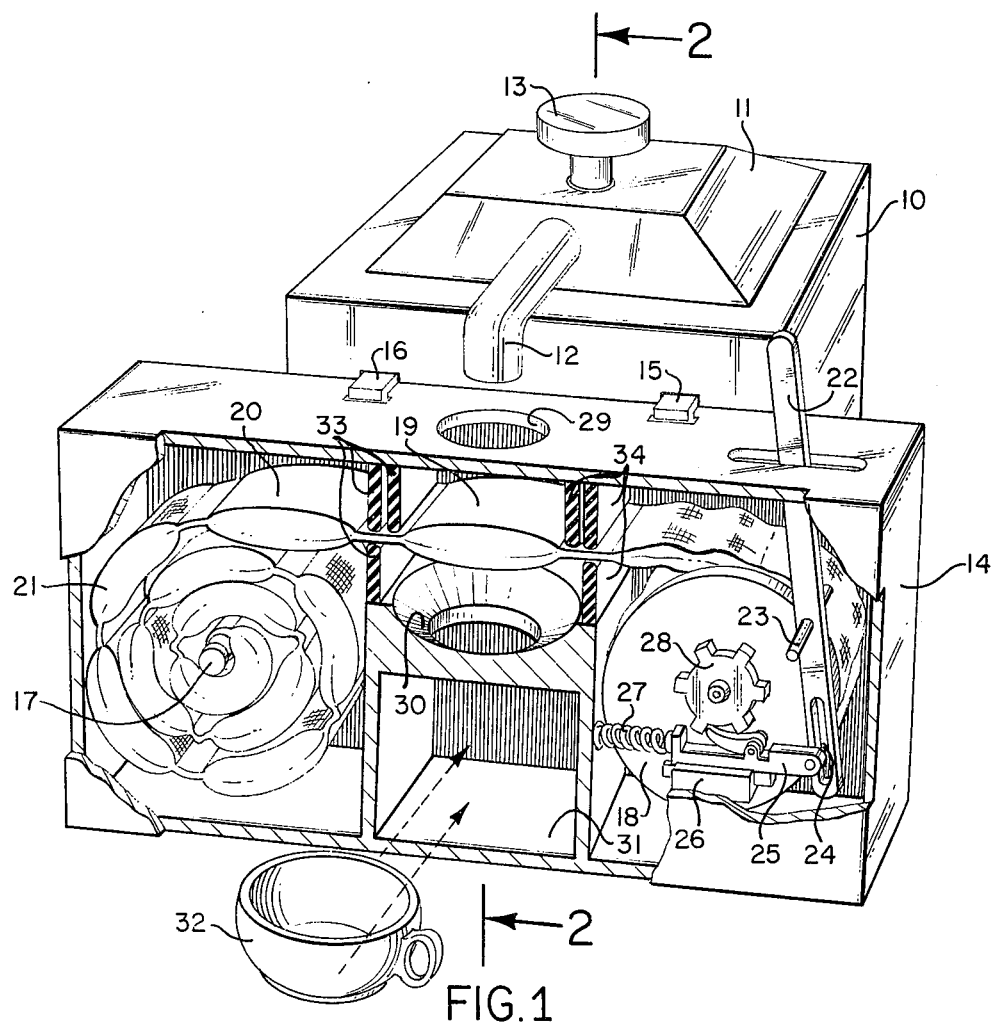
FIG. 1 is a perspective view partly broken away of a complete apparatus particularly adapted for brewing coffee as an illustrative example of one application; and, FIG. 2 is a cross section taken in the direction of the arrows 2—2 of FIG. 1 illustrating further details of the apparatus.

With respect to the coffee brewing features of the present invention, reference is now had to FIG. 1 which shows a housing 10 having a cover 11 and incorporating a container holding water at a desired temperature for dispensing from a spout 12 in response to pressing of a valve 13. Details of the container within the housing 10 will be described shortly.

A cartridge 14 is shown coupled to the front end of the housing 10 as by clips 15 and 16. This cartridge 14 includes pay out and take up spools 17 and 18 carrying a series of porous packets connected end-to-end such as indicated at 19, 20 and 21 to define essentially a ribbon.

Manually operable means coupled to the take up spool is provided to rotate it through a given amount to enable individual packets to be successively positioned between the spools such as the packet 19. This manually operable means takes the form of a simple lever 22 pivoted at 23 in the cartridge and having its far end coupled by a pin and slot arrangement 24 to a ratchet bar 25. Ratchet bar 25 is arranged to move along a guide block 26 back and forth, the ratchet bar being biased to a right hand position as by a biasing spring 27 as viewed in FIG. 1. The ratchet bar itself includes a pawl or finger arranged to engage ratchet wheel 28, it being understood that the ratchet wheel 28 is coupled to the take up spool 18 in such a manner as to rotate it only in a clockwise direction as viewed in FIG. 1, the ratchet bar being free to return in an opposite direction without rotating the spool 18. It will be understood, of course, that any other suitable mechanism may be provided for rotating the take up spool in response to a manual or electro-mechanical operation such as used to advance film in a camera.

With the foregoing arrangement, gear 28, movement of the lever 22 to the right for one or a number of smaller strokes will serve to position a successive packet between the spools.

The cartridge 14 defines an upper opening 29 vertically above a positioned packet such as the packet 19, this opening being vertically beneath the outlet spout 12. In this respect, the securing clips 15 and 16 properly position the cartridge 14 relative to the housing 10 so that water dispensed from the spout 12 will pass through the opening 29.

In the lower central portion of the cartridge 14 there is defined a funnel shaped structure 30 below which a cup receiving area 31 is provided for a coffee cup 32.

The cartridge structure is completed by the provision of entrance and exit flexible sealing lips 33 and 34 at the points the series of packets or ribbon leave the pay out spool and are received on the take up spool. The arrangement is such that the positioned packet such as 19 is isolated by the sealing lips from the remaining packets.

Figure 2:
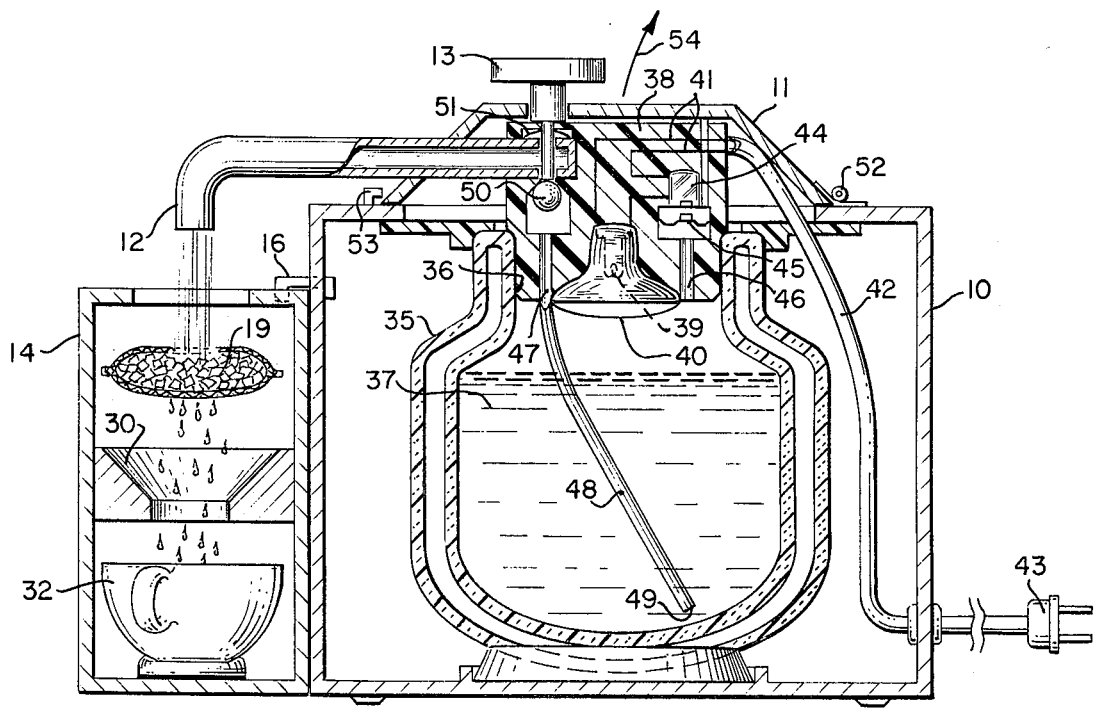

Referring now to the cross section of FIG. 2, there is shown the referred to container within the housing 10 at 35. This container is of evacuated double wall construction to provide appropriate heat insulation as shown and includes an open neck 36 for receiving a beverage such as water 37. Normally, the beverage will be heated to a desired temperature before being placed in the container 35, the function of the container being to maintain the desired temperature over long periods of time as will become clearer as the description proceeds.

A stopper member 38 is receivable in the neck 37 as shown. This stopper member incorporates an electric bulb 39 having an exposed surface 40 facing downwardly towards the top surface of the beverage 37 when the container is filled. Electrical conductors 41 pass from the bulb through the stopper member and thence through a cord 42 to an exterior plug 43 for connection to a source of electrical energy to energize the bulb.

The bulb 40 is evacuated and mirror-coated over its back portion and is of a size to cover a major portion of the cross sectional area of the neck portion of the container thus providing heat insulation at the neck portion of the container as well as functioning to radiate heat to a beverage in the container.

In order to avoid over-heating of the beverage, there is provided a pressure actuated switch means incorporated in the stopper. This switch means may take the form of a micro switch 44 arranged to be actuated by a movable diaphragm 45 formed in the stopper and in communication with the interior of the container through passage 46. The micro switch 44 is connected in one of the electrical conductors 41 such that when it is open, energy is blocked from the bulb 39 and when it is closed, the bulb is energized. Micro switch 44 is normally on or in closed position so that when it is engaged by the diaphragm contact 45, it will open to remove electrical energy from the bulb. The diaphragm 45 itself will move upwardly in response to an increased vapor pressure in the container 35 which increased vapor pressure will result when the temperature of the beverage therein increases above the desired temperature. Similarly, when the pressure drops below a given value as determined by a drop in the temperature of the beverage below the desired value, the diaphragm 45 will move in an opposite direction to permit micro switch 44 to close and thereby apply energy to the bulb 39.

The stopper member 38 as shown in FIG. 2 also includes an internal passage 47 terminating at one end in the outlet spout 12 and at its other end internally within the container in an elongated tube 48 extending towards the bottom of the container to terminate in an open end 49. The valve means 13 intercepts the internal passage and may constitute a simple ball type valve 50 biased to a normally closed position as by a spring 51 to normally close off the passage. It will be appreciated that when the valve 13 is depressed, the ball valve 50 will be unseated to open the passage and thus result in the beverage being dispensed from the spout 12. The interior of the container 35 is always under a certain amount of pressure and this vapor pressure will cause the beverage therein to be forced up through the dispensing tube 48 when the valve is opened.

In the particular embodiment shown in FIG. 2, the cover 11 of the housing 10 is hinged at 52, the opposite side of the cover being normally held on the top of the housing as by a small catch 53. With this arrangement, the catch 53 may be released and the entire cover together with the stopper member 38 swung upwardly to unseat the stopper from the open neck 36 of the container 35 whereby making it very simple to fill the container with a pre-heated beverage.

Shown to the left of the housing 10 in FIG. 2 is the cartridge 14 wherein there is illustrated the packet 19 which may be filled with coffee beans finely ground in a position to be saturated with heated water from the spout 12. Coffee is thus brewed directly in the cartridge 14, the droppings or drips from the packet 19 being collected in the funnel structure 30 to pass into the cup 32.

OPERATION

In operation, it is to be understood that the container 35 described in FIG. 2 may be used simply as a means for maintaining a beverage at a desired temperature over a long period of time. Thus, in one application of this invention, the container 35 may be initially filled with fresh brewed coffee and the stopper 38 then positioned thereon. The excellent insulating properties of the container and stopper in conjunction with the radiated heat from the bulb 40 being properly controlled by means of the pressure switch results in minimum evaporation and a maintenance of the brewed coffee at a desired temperature. Thus, the container can serve the purpose of maintaining already prepared coffee in a heated condition if it is desired to utilize the apparatus in this manner.

On the other hand, and as pointed out heretofore, the ultimate cup of coffee results when it is initially brewed and for this purpose, the cartridge 14 would be coupled to the housing 10 and the packets successively positioned beneath the spout 12 for fresh brewing of each cup of coffee. The beverage in the container would be water.

It will be understood that if a person desires a fairly strong cup of coffee, he could position a first packet under the spout 12 and permit brewing of the coffee to fill his cup halfway. The ratchet mechanism described in FIG. 1 can then be operated to position a fresh packet of coffee beneath the spout and the remaining half of the cup filled from brewed coffee derived from this next pack. Normally, however, each packet will have sufficient coffee to provide a normal cup.

The used packets are simply wound up on the take up spool 18 described in FIG. 1 and when the complete ribbon of packets has been used up, a new cartridge may readily be substituted.

The packets, of course, may contain ingredients other than coffee beans; for example, tea or other substances dissolvable in water to provide a desired beverage.

As mentioned heretofore, other means than that described may be provided for advancing the packets of coffee. In the simplified version shown, the operator will simply ratchet back and forth the handle 22 and he can tell by "feel" when a packet is positioned between the lips 33 and 34, these lips functioning more or less as detents to index the packet's position. An alternative would be to provide sprocket holes in the packet ribbon carrier and advance the same with a separate sprocket wheel so that precise degrees of rotation will move the packets exactly the same distance each time, the take-up reel then simply being spring-biased to receive the used packets.

When the container is used by itself simply to maintain a beverage at a desired temperature, it should be appreciated that this temperature need not necessarily be below the boiling point but by adjusting the pressure responsive switch, liquid in the container such as water could be maintained at any desired temperature thus serving as a pressure cooker or, by utilizing a suitable outlet control valve, as a vaporizer. The excellent heat insulation properties of the container minimize the necessary power for maintaining any desired temperature and in this respect, it should be understood that the source of energy for the bulb could constitute a battery thereby making the unit portable.

From the foregoing description, it will be evident that the present invention has provided an improved apparatus wherein it is at long last possible to provide the "perfect" cup of coffee.

What is claimed is:

1. A beverage heat maintaining apparatus including in combination:
   a. a container of evacuated double wall construction to provide heat insulation having an open neck for receiving a beverage after the beverage has been heated to a desired temperature;
   b. a stopper member receivable in said neck, said stopper member incorporating an electric bulb having an exposed surface facing downwardly towards the top surface of said beverage when said container is filled, said electric light bulb being positioned by said stopper within said neck, and being of a size to cover a major portion of the cross-sectional area of said neck; and,
   c. electrical conductors passing from said bulb through said stopper member and to the exterior thereof for connection to a source of electrical energy to energize said bulb, said bulb being evacuated whereby a major portion of said cross sectional area of the neck portion of said container is vacuum insulated by said bulb and whereby heat radiated by said bulb maintains said beverage in a heated condition.

2. An apparatus according to claim 1, including pressure actuated switch means incorporated in said stopper and connected to one of said electrical conductors between said bulb and said source of electrical energy responsive to vapor pressure in said container exceeding a given value resulting when said temperature of said beverage exceeds said desired temperature to open and de-energize the bulb, said switch means automatically closing when said vapor pressure falls below another given value resulting when the temperature of said beverage falls below said desired temperature whereby said beverage is maintained substantially at said desired temperature.

3. An apparatus according to claim 2, in which said stopper member has an internal passage terminating at one end in an outlet spout and at its other end internally within said container in an elongated tube extending towards the bottom of said container to terminate in an open end; and valve means in said stopper intercepting said internal passage for opening and closing said passage whereby beverage may be dispensed by vapor pressure in said container forcing the beverage through said tube and passage and out said spout when said passage is open.

4. An apparatus according to claim 3, in which said beverage is water and wherein there is provided cartridge means incorporating pay out and take up spools carrying a series of porous packets connected end-to-end to define a ribbon; and manually operable means coupled to the take up spool to rotate it a given amount to enable individual packets to be successively positioned between said spools, said cartridge defining an upper opening vertically above a positioned packet, said upper opening being positioned vertically beneath said outlet spout, said cartridge further defining a cup receiving area below said positioned packet whereby said packet may be filled with coffee beans and coffee brewed in said cup by operating said valve means to open said passage and permit heated water to pass through said positioned packet to said cup, a next cup of coffee being prepared by operating said manually operable means to position a next packet in said ribbon in a position between said spools beneath said upper opening, and passing water through said next packet from said container.

5. An apparatus according to claim 4, in which said cartridge means includes entrance and exit flexible sealing lips at the points the ribbon of packets leaves said pay out spool and are received on said take up spool such that a positioned packet is isolated between said entrance and exit sealing lips.

6. An apparatus according to claim 5, including a housing for said container, said housing having clip means for holding said cartridge in a position such that said upper opening is centered beneath said outlet spout.

* * * * *